(12) United States Patent
Chiu et al.

(10) Patent No.: US 8,379,399 B2
(45) Date of Patent: Feb. 19, 2013

(54) MOUNTING APPARATUS FOR EXPANSION CARD

(75) Inventors: Po-Wen Chiu, Taipei Hsien (TW); Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 223 days.

(21) Appl. No.: 12/914,858

(22) Filed: Oct. 28, 2010

(65) Prior Publication Data

US 2011/0310575 A1 Dec. 22, 2011

(30) Foreign Application Priority Data

Jun. 21, 2010 (CN) .......................... 2010 1 0204534

(51) Int. Cl.
*H05K 5/00* (2006.01)
(52) U.S. Cl. ....................................... 361/759; 361/801
(58) Field of Classification Search .................. 361/752, 361/756, 759, 796, 801, 802; 312/223.2
See application file for complete search history.

(56) References Cited

U.S. PATENT DOCUMENTS

| | | | |
|---|---|---|---|
| 7,522,423 B2 * | 4/2009 | Chen et al. ..................... 361/728 |
| 2006/0232952 A1 * | 10/2006 | Peng et al. ..................... 361/796 |
| 2008/0100994 A1 * | 5/2008 | Fan et al. ....................... 361/679 |
| 2009/0129002 A1 * | 5/2009 | Wu et al. ...................... 361/679.4 |

* cited by examiner

*Primary Examiner* — Yuriy Semenenko
(74) *Attorney, Agent, or Firm* — Altis Law Group, Inc.

(57) ABSTRACT

A mounting apparatus includes a chassis, a mounting tray accommodated in the chassis, a base portion configured for being attached to an expansion card, and a securing member. The mounting tray includes a front panel, the front panel defines a expansion slot. A supporting piece is located on the front panel and adjacent to the expansion slot, and a clasping piece is positioned on the front panel, near to the supporting piece. A flange is located on the base portion, for abutting the supporting piece. The securing member is located between the flange and the clasping piece. Wherein the securing member is mounted to the clasping piece and the flange is located between the securing member and the supporting piece.

18 Claims, 6 Drawing Sheets

MOUNTING APPARATUS FOR EXPANSION CARD

BACKGROUND

1. Technical Field

The present disclosure relates to mounting apparatuses, and particularly to a mounting apparatus for securing expansion cards in an electronic device.

2. Description of Related Art

A computer system usually includes expansion cards, such as sound cards, video cards, graphics cards and so on, for enhancing capabilities of the computer system. The expansion cards are often attached to the computer system with screws. However, using screws to attach the expansion cards is very laborious and time-consuming.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
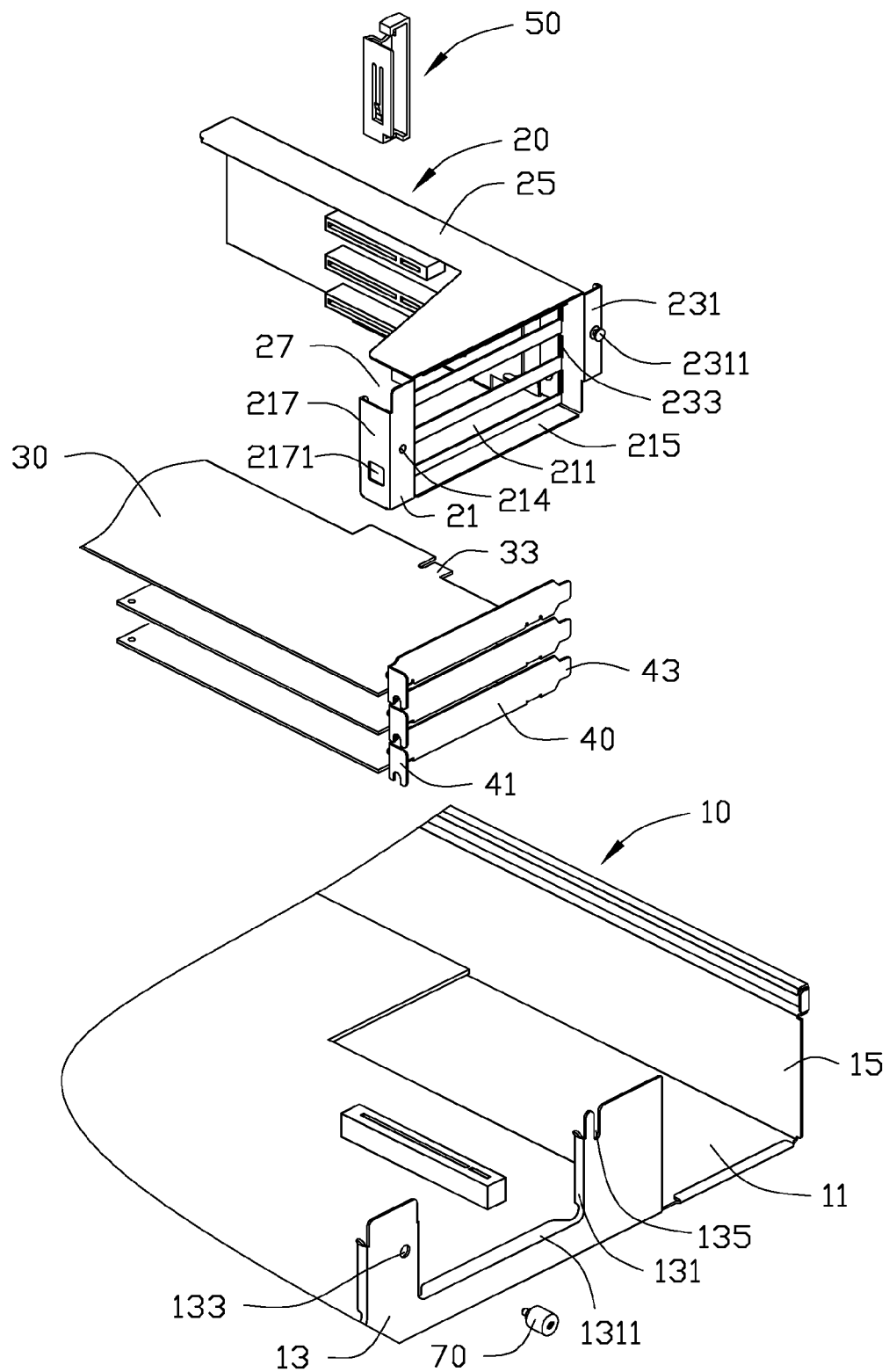
FIG. 1 is an exploded, cutaway, isometric view of a mounting apparatus for an expansion card in accordance with an embodiment.
Figure 2:
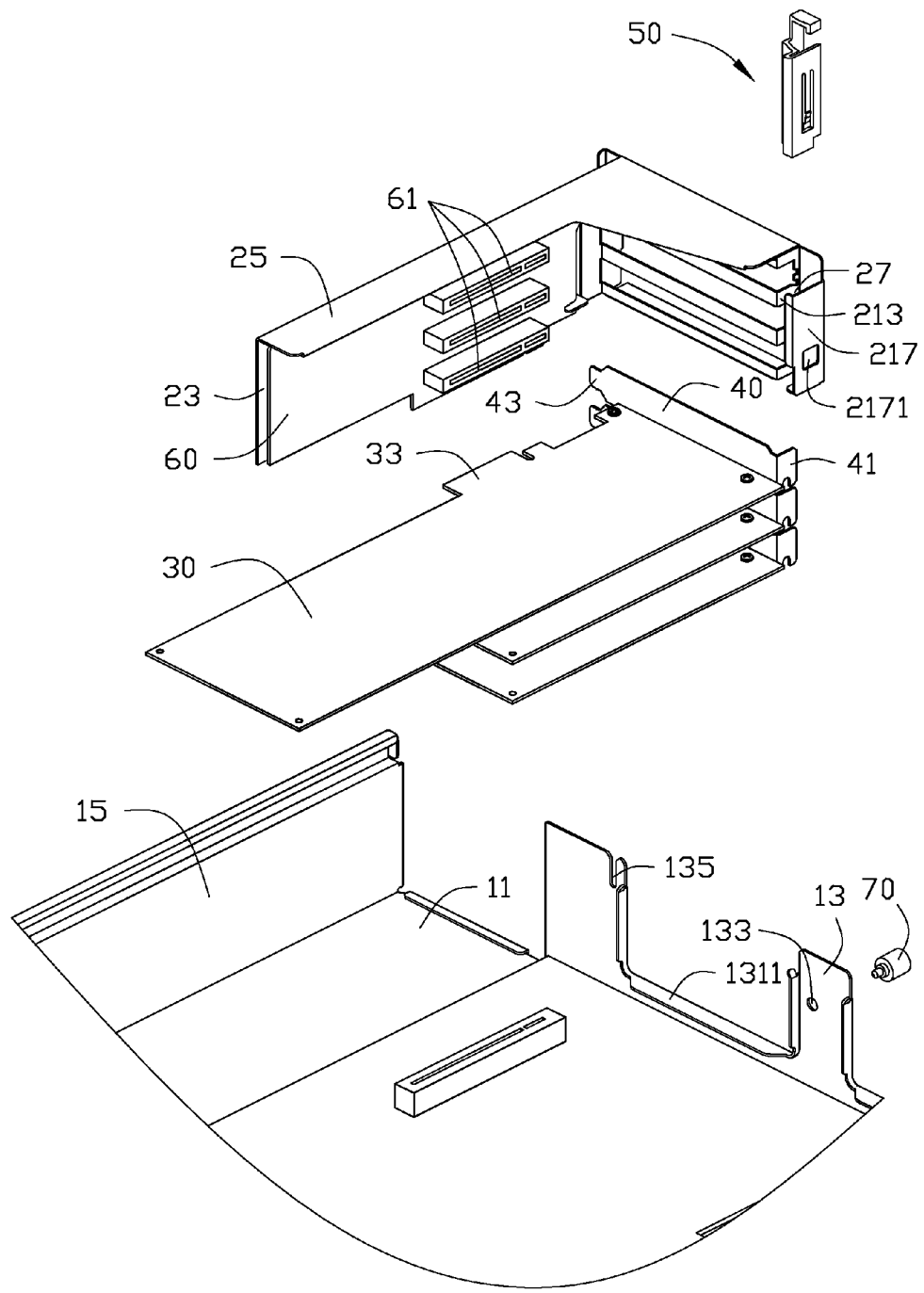
FIG. 2 is similar to FIG. 1, but viewed from a different aspect.
Figure 3:
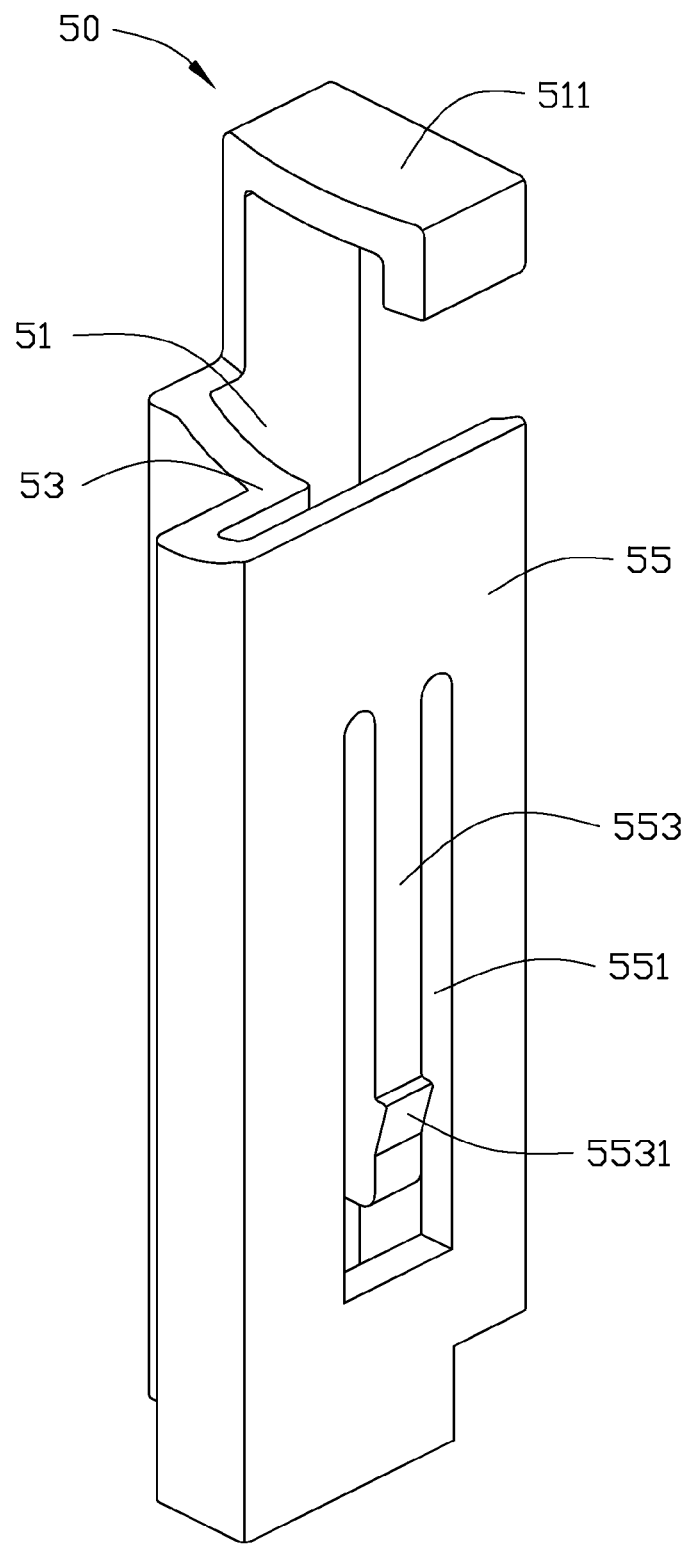
FIG. 3 is a view of a securing member of the mounting apparatus in accordance with an embodiment.

Referring to FIGS. 1 to 3, a mounting apparatus, according to one embodiment, is configured for securing three expansion cards 30, and includes a chassis 10, a mounting tray 20, and a securing member 50. The three expansion cards 30 may be, for example, sound cards, video cards, or graphics cards, or other Peripheral Component Interconnection (PCI) cards.

An insertion piece 33 extends from a side of each of the three expansion cards 30. A base portion 40 is attached to a front of the each of the three expansion cards 30. A flange 41 is located one end of each base portion 40, and an insertion portion 43 is positioned on the other end of each base portion 40.

The chassis 10 includes a bottom plate 11, a front plate 13 located on a shorter edge of the bottom plate 11, and a side plate 15 located on a longer edge of the bottom plate 11. In one embodiment, the bottom plate 11 is substantially perpendicular to the front plate 13 and the side plate 15. An opening 131, a screw hole 133 and a notch 135 are defined in the front plate 13. The opening 131 is positioned between the screw hole 133 and the notch 135. A supporting portion 1311 extends from a bottom edge of the opening 131.

The mounting tray 20 includes a front panel 21, a side panel 23 and a top panel 25. The top panel 25 is connected to the front panel 21 and the side panel 23. In one embodiment, the top panel 25 is substantially perpendicular to the front panel 21 and the side panel 23. Three expansion slots 211 are defined in the front panel 21. A supporting piece 213 is located on the front panel 21. Each of the three expansion slots 211 is defined between each two adjacent expansion slots 211. A fixing hole 214 is defined in the front panel 21 at one side of the supporting piece 213, corresponding to the screw hole 133 of the front plate 13. A bending piece 215 is located on an edge of the front panel 21, for being placed on the supporting portion 1311 of the front plate 13.

A clasping piece 217 is connected to an edge of the front panel 21, and a clasping hole 2171 is defined in a bottom of the clasping piece 217. In one embodiment, the clasping piece 217 is substantially perpendicular to the front panel 21. An accommodating space 27 is formed by the clasping piece 217, the supporting piece 213 and the front panel 21, for receiving the securing member 50. A securing piece 231 is positioned on the front of the side panel 23. Three clipping holes 233 are defined in the side panel 23, adjacent to the securing piece 231, for receiving the insertion portions 43 of the base portions 40. In one embodiment, the securing piece 231 is substantially perpendicular to the side panel 23. A positioning post 2311 is located on the securing piece 231, to be inserted into the notch 135 of the front plate 13. A riser card 60 is attached to an inner surface of the side panel 23, and three sockets 61 are defined on the riser card 60, for accommodating the insertion pieces 33 of the three expansion cards 30.

The securing member 50 includes a connecting plate 53, a clipping plate 55, and a securing plate 51 abutting the supporting piece 213. In one embodiment, the connecting plate 53 is connected between the securing plate 51 and the clipping plate 55. An operating portion 511 extends from the top of the securing plate 51. In one embodiment, the operating portion 511 is a hook, and the connecting plate 53 is L-shaped. An aperture 551 is defined in a center of the clipping plate 55, and an elastic connecting arm 553 extends from an upper edge of the aperture 551. A hook 5531 protrudes from a bottom of the connecting arm 553, for being inserted into the clasping hole 2171.

Figure 4:
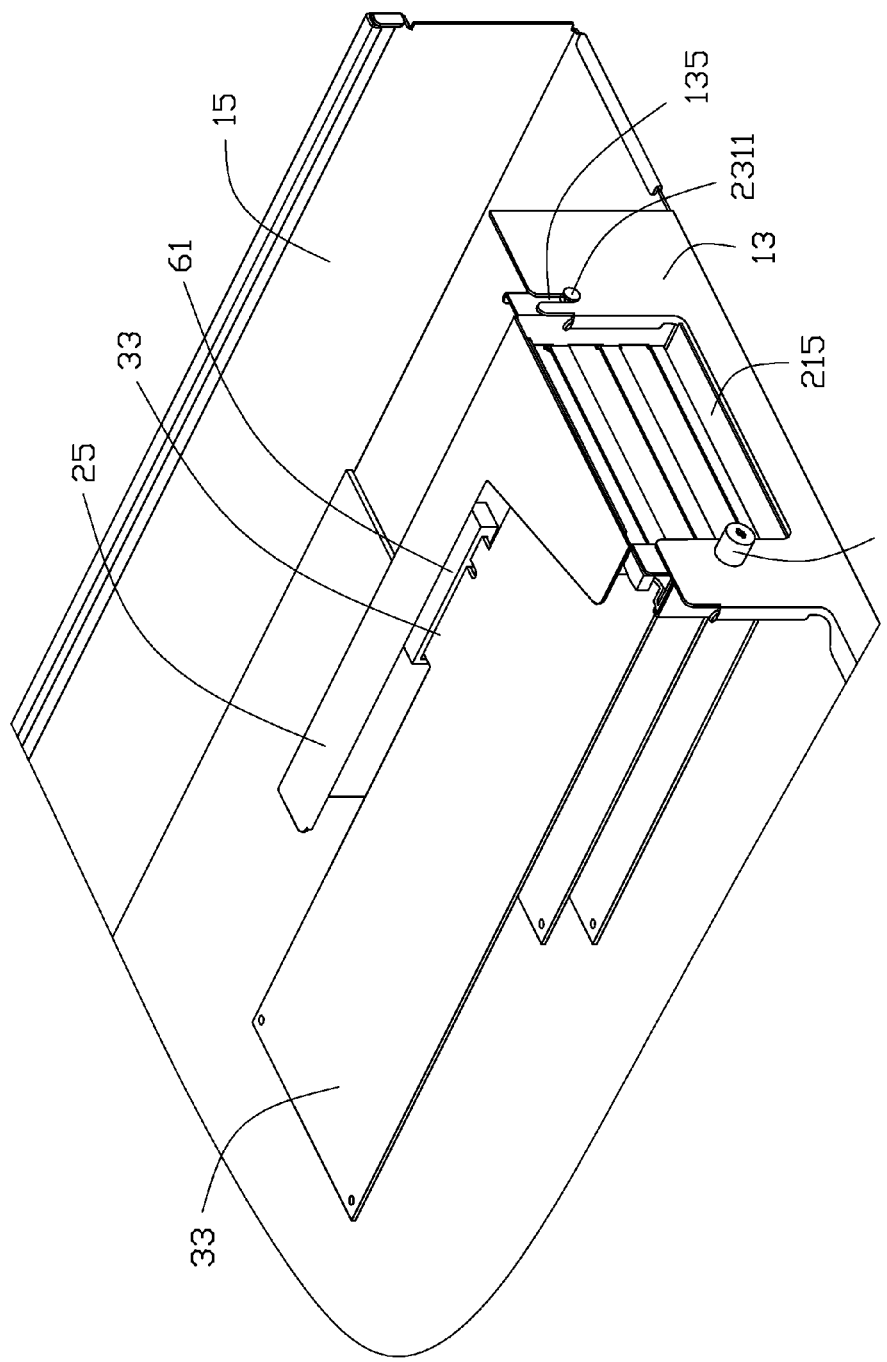
FIG. 4 is an assembled view of FIG. 1.
Figure 5:
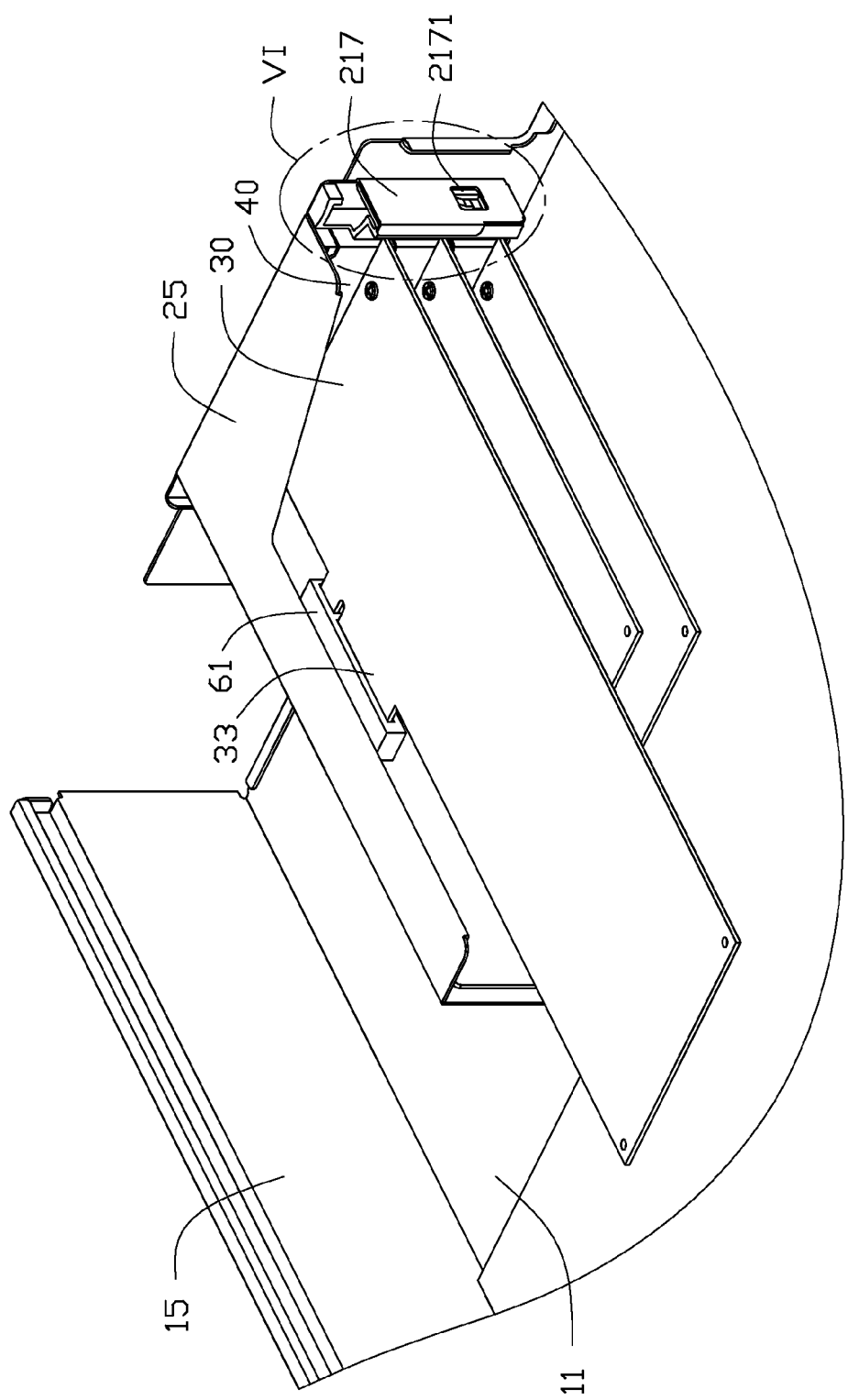
FIG. 5 is an assembled view of FIG. 2.
Figure 6:
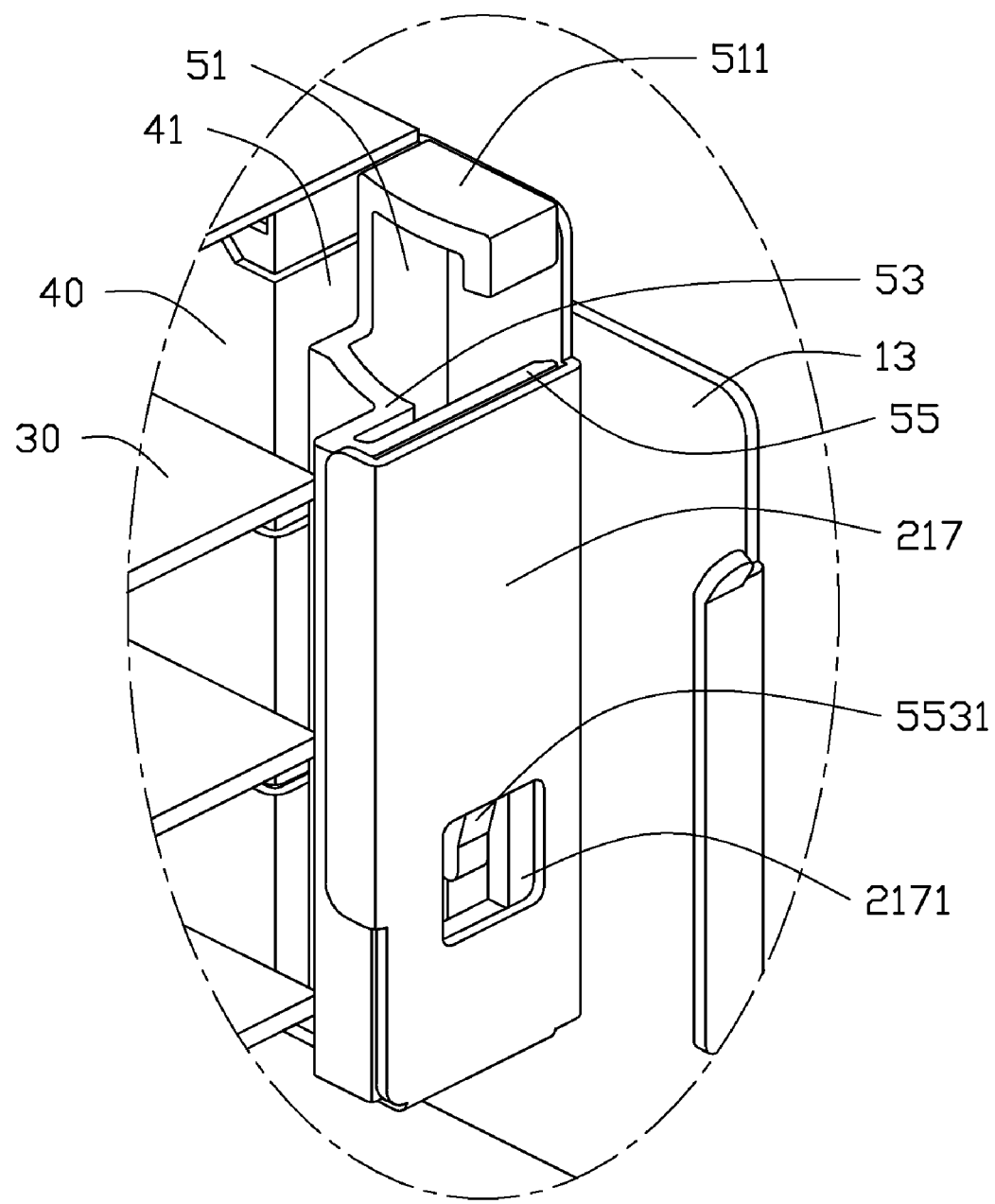
FIG. 6 is an enlarged view of circled portion VI of FIG. 5.

Referring to FIGS. 4 to 6, in assembly, each mounting tray 20 is accommodated in the opening 131 of the front plate 13, and the bending piece 215 of the mounting tray 20 abuts the supporting portion 1311 of the front plate 13. The positioning post 2311 is inserted into the notch 135 of the front plate 13. The screw hole 133 of the front plate 13 is aligned with the fixing hole 214 of the front panel 21, and a screw member 70 is inserted into the screw hole 133 and the fixing hole 214, to secure the mounting tray 20 to the front plate 13.

The three expansion cards 30 are received in the mounting tray 20, and the base portions 40 are positioned on the expansion slots 211. The insertion pieces 33 of the three expansion cards 30 are inserted into the three sockets 61 of the riser card 60. The insertion portions 43 are inserted into the three clipping holes 233 of the side panel 23. The flanges 41 of the base portions 40 abut the supporting piece 213 of the front panel 21.

The securing member 50 is placed in the accommodating space 27 along a direction perpendicular to the bottom plate 11, until the hook 5531 of the securing member 50 is clipped into the clasping hole 2171 of the clasping piece 217. The securing plate 51 of the securing member 50 tightly abuts the flanges 41 of the base portions 40, and the flanges 41 are tightly engaged with the supporting piece 213 of the front panel 21. Therefore, the expansion cards 30 can be steadily secured on the mounting tray 20.

In disassembly, the connecting arm 553 is elastically deformed in a direction towards the securing plate 51, until the hook 5531 of the connecting arm 553 is disengaged from the clasping hole 2171. So, the operating portion 511 is pulled to move the securing member 50 out of the accommodating space 27. The expansion cards 30 are moved away from the side panel 23. The inserting piece 33 is disengaged from the sockets 61 of the riser card 60, and the insertion portions 43 is disengaged from the clipping holes 233 of the side panel 23. Thus, the expansion cards 30 can be disassembled from the mounting tray 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
   a chassis comprising a bottom plate;
   a mounting tray accommodated in the chassis, the mounting tray comprising a front panel, the front panel defining an expansion slot, a supporting piece located on the front panel and adjacent to the expansion slot, and a clasping piece positioned on the front panel, near to the supporting piece;
   a base portion configured for being attached to an expansion card, and a flange located on the base portion, for abutting the supporting piece; and
   a securing member located between the flange and the clasping piece;
   wherein the securing member is moveable in a direction substantially perpendicular to the bottom plate to be mounted to the clasping piece, and the flange is located between the securing member and the supporting piece; a clasping hole is defined in the clasping piece, a hook is positioned on the securing member, and the hook is inserted into the clasping hole for mounting the securing member to the clasping piece.

2. The mounting apparatus of claim 1, wherein the securing member comprises a connecting arm, the hook is disposed on the connecting arm, and the connecting arm is deformable to disengage the hook from the clasping hole.

3. The mounting apparatus of claim 2, wherein the securing member comprises a securing plate and a clipping plate, the securing plate abuts the supporting piece, and the connecting arm is disposed on the clipping plate.

4. The mounting apparatus of claim 3, wherein the securing member further comprises a connecting plate, and the connecting plate is connected to the securing plate and the clipping plate.

5. The mounting apparatus of claim 3, wherein an aperture is defined in the clipping plate, and the connecting arm is connected to an edge of the aperture.

6. The mounting apparatus of claim 1, wherein the clasping piece is substantially perpendicular to the front panel.

7. The mounting apparatus of claim 1, wherein the chassis comprises a front plate, and the front panel of the mounting tray is attached to the front plate.

8. The mounting apparatus of claim 7, wherein the mounting tray comprises a side panel connected to the front panel, a securing piece is located on the side panel, a positioning post is disposed on the securing piece, and a notch is defined in the front plate for receiving the positioning post.

9. The mounting apparatus of claim 8, wherein a clipping hole is defined in the side panel, and an insertion portion extends from the base portion.

10. A mounting apparatus comprising:
    a chassis comprising a bottom plate, and a front plate connected to the bottom plate;
    a mounting tray located on the bottom plate, comprising a front panel mounted to the front plate, the front panel defining a expansion slot, a supporting piece located on the front panel and adjacent to the expansion slot, a clasping piece positioned on the front panel and opposite to the supporting piece, and the supporting piece and the clasping piece forming an accommodating space;
    a base portion configured for being attached to an expansion card, and locating a flange for abutting the supporting piece; and
    a securing member, received in the accommodating space, comprising a securing plate and a clipping plate;
    wherein the securing plate abuts the flange, and the clipping plate is mounted to the clasping piece to prevent the flange from disengaging from the supporting piece.

11. The mounting apparatus of claim 10, wherein the securing member further comprises a connecting plate, and the connecting plate is connected to the securing plate and the clipping plate.

12. The mounting apparatus of claim 10, wherein a clasping hole is defined on the clasping piece, a hook is positioned on the securing member, and the hook is inserted into the clasping hole for mounting the securing member to the clasping piece.

13. The mounting apparatus of claim 12, wherein a connecting arm is disposed on the clipping plate, the hook is disposed on the connecting arm, and the connecting arm is deformable to disengage the hook from the clasping hole.

14. The mounting apparatus of claim 13, wherein an aperture is defined in the clipping plate, and the connecting arm is connected to an edge of the aperture.

15. The mounting apparatus of claim 10, wherein the clasping piece is substantially perpendicular to the front panel.

16. The mounting apparatus of claim 10, wherein the mounting tray comprises a side panel connected to the front panel, a securing piece is located on the side panel, a positioning post is disposed on the securing piece, and a notch is defined in the front plate for receiving the positioning post.

17. The mounting apparatus of claim 16, wherein a clipping hole is defined in the side panel, and an insertion portion extends from the base portion.

18. The mounting apparatus of claim 10, wherein an operating portion extends from on the top of the securing plate, and the operating portion is operated to make the securing member in or out of the accommodating space.

* * * * *